(12) United States Patent
Masuda et al.

(10) Patent No.: US 8,279,379 B2
(45) Date of Patent: Oct. 2, 2012

(54) LIGHT RECEIVING DEVICE, LIGHT RECEIVING DEVICE MANUFACTURING METHOD, AND LIGHT RECEIVING METHOD

(75) Inventors: Shin Masuda, Miyagi (JP); Eiji Kato, Miyagi (JP)

(73) Assignee: Advantest Corporation, Tokyo (JP)

( * ) Notice: Subject to any disclaimer, the term of this patent is extended or adjusted under 35 U.S.C. 154(b) by 244 days.

(21) Appl. No.: 12/889,230

(22) Filed: Sep. 23, 2010

(65) Prior Publication Data

US 2011/0090431 A1 Apr. 21, 2011

(30) Foreign Application Priority Data

Oct. 15, 2009 (JP) .................................. 2009-238745

(51) Int. Cl.
*G02F 1/1335* (2006.01)
*G02F 1/29* (2006.01)
*G02B 26/08* (2006.01)

(52) U.S. Cl. ........................... 349/96; 359/301; 359/303

(58) Field of Classification Search ........................ None
See application file for complete search history.

(56) References Cited

U.S. PATENT DOCUMENTS

| 7,768,689 | B2* | 8/2010 | Furuyama ...................... 359/290 |
| 8,044,483 | B2* | 10/2011 | Furuyama ...................... 257/462 |
| 2005/0064303 | A1* | 3/2005 | Yamada et al. ................... 430/5 |
| 2006/0139921 | A1* | 6/2006 | Saeki ............................ 362/253 |
| 2007/0262405 | A1 | 11/2007 | Furuyama |
| 2009/0134486 | A1 | 5/2009 | Fujikata |
| 2010/0244170 | A1 | 9/2010 | Furuyama |
| 2011/0090431 | A1* | 4/2011 | Masuda et al. ................... 349/96 |

FOREIGN PATENT DOCUMENTS

| JP | 57-073705 A | 5/1982 |
| JP | 08-261824 A | 10/1996 |
| JP | 09-152374 A | 6/1997 |
| JP | 2007-248141 A | 9/2007 |
| WO | 2007/105593 A1 | 9/2007 |

OTHER PUBLICATIONS

Ishi et al., "Si Nano-Photodiode with a Surface Plasmon Antenna", Japanese Journal of Applied Physics, Japan, Mar. 4, 2005, vol. 44, No. 12, pp. L364-L366 Mentioned on p. 1 of as-filed specification.
Yamaguchi et al., "Liquid Crystal Polarizers with Axially Symmetrical Properties", Japanese Journal of Applied Physics, Japan, Sep. 1989, vol. 28, No. 9, pp. 1730-1731 Mentioned on p. 1 of as-filed specification.

(Continued)

*Primary Examiner* — Rhonda Peace
(74) *Attorney, Agent, or Firm* — Chen Yoshimura LLP

(57) ABSTRACT

There is provided a light receiving device including a polarization dispersing section that disperses a polarization direction of incoming light into a plurality of polarization directions, a light collecting section that has a metal pattern shaped like concentric circles on a surface thereof, where the light collecting section collects light that has passed through the polarization dispersing section, and a light receiving section that receives the light collected by the light collecting section. Also provided are a light receiving device manufacturing method and a light receiving method. The light collecting section may have a surface plasmon antenna that has the metal pattern shaped like the concentric circles on a surface thereof, and the light receiving section may receive the light collected toward a center of the concentric circles of the metal pattern of the light collecting section, through a hole at the center of the concentric circles, on a rear side of the light collecting section.

11 Claims, 6 Drawing Sheets

OTHER PUBLICATIONS

Masuda et al., "Optical Properties of a Polarization Converting Device Using a Nematic Liquid Crystal Cell", Optical Review, Japan, 1995, vol. 2, No. 3, pp. 211-216 Mentioned on p. 1 of as-filed specification.

Written Opinion (PCT/ISA/237) issued in PCT/JP2010/005446 mailed in Oct. 2010.

* cited by examiner

LIGHT RECEIVING DEVICE, LIGHT RECEIVING DEVICE MANUFACTURING METHOD, AND LIGHT RECEIVING METHOD The contents of the following Japanese patent application is incorporated herein by reference, No. 2009-238745 filed on Oct. 15, 2009.

BACKGROUND

1. Technical Field

The present invention relates to a light receiving device, a light receiving device manufacturing method, and a light receiving method.

2. Related Art

Conventionally known light-harvesting-antenna-type light receiving elements make use of surface plasmons propagating along the surface of electrically conductive materials such as metal as disclosed in, for example, Japanese Patent Application Publication No. 2007-248141 and Tsutomu Ishi, et al., "Si Nano-Photodiode with a Surface Plasmon Antenna", Japanese Journal of Applied Physics, Japan, March 2005, Vol. 44, No. 12, pp.L364-L366. Furthermore, known polarization dispersing elements convert linearly polarized incoming light into radially or concentrically polarized light as disclosed in, for example, Rumiko Yamaguchi, et al., "Liquid Crystal Polarizers with Axially Symmetrical Properties", Japanese Journal of Applied Physics, Japan, July 1989, Vol. 28, No. 9, pp. 1730-1731 and Shin Masuda, et al., "Optical Properties of a Polarization Converting Device Using a Nematic Liquid Crystal Cell", OPTICAL REVIEW, Japan, 1995, Vol. 2, No. 3, pp. 211-216.

Here, the light-harvesting-antenna-type light receiving elements exhibit largely varying light collection efficiency depending on the polarization direction of the incoming light. Therefore, such light receiving elements may suffer from poor light collection efficiency when irradiated with light polarized in a single direction.

SUMMARY

A first embodiment of present invention provides a light receiving device including a polarization dispersing section that disperses a polarization direction of incoming light into a plurality of polarization directions, a light collecting section that has a metal pattern shaped like concentric circles on a surface thereof, where the light collecting section collects light that has passed through the polarization dispersing section, and a light receiving section that receives the light collected by the light collecting section. The first embodiment of the present invention also provides a light receiving device manufacturing method and a light receiving method.

The summary clause does not necessarily describe all necessary features of the embodiments of the present invention. The present invention may also be a subcombination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
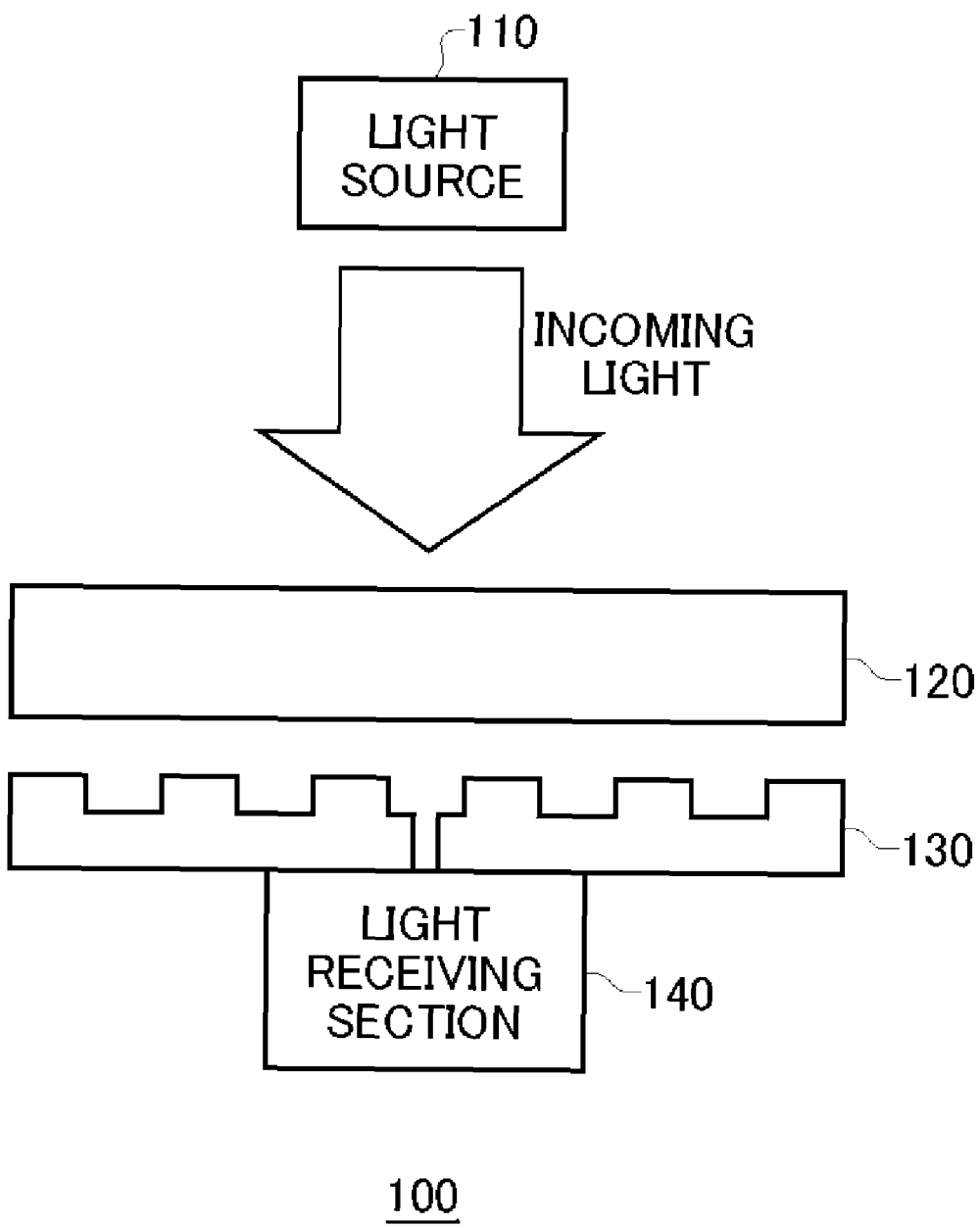
FIG. 1 illustrates an exemplary structure of a light receiving device 100 relating to an embodiment of the present invention, together with a light source 110.

FIG. 1 illustrates an exemplary structure of a light receiving device 100 relating to an embodiment of the present invention, together with a light source 110. The light receiving device 100 receives light emitted from the light source 110 directly from the light source 110 or via optical members such as lenses and/or optical fibers. The light source 110 may be a laser light source that emits light polarized in a single direction. The light source 110 may output light that is modulated at a predetermined frequency. The light source 110 may be a terahertz light source that emits light at frequencies in the terahertz range. The light receiving device 100 efficiently receives a laser output that is modulated at a predetermined frequency and polarized in a predetermined direction. The light receiving device 100 is constituted by a polarization dispersing section 120, a light collecting section 130, and a light receiving section 140.

The polarization dispersing section 120 disperses the one or more polarization directions of incoming light into a larger number of polarization directions. The polarization dispersing section 120 may disperse incoming light that is polarized in a single direction in a radial manner. Alternatively, the polarization dispersing section 120 may disperse the polarization direction of incoming light in a concentric manner. The polarization dispersing section 120 may disperse the polarization direction of incoming light by means of liquid crystal cells.

The light collecting section 130 has a concentric metal pattern formed on the surface thereof, and collects the light that has passed through the polarization dispersing section 120. The light collecting section 130 may be a surface plasmon antenna that has a concentric metal pattern formed on the surface thereof. Alternatively, the light collecting section 130 may have a metal pattern that is formed like a plurality of ellipses or polygons with the same center. The light collecting section 130 may have a hole at the center of the concentric circles of the metal pattern and output the collected light to its rear surface through the hole.

The light receiving section 140 receives the light collected by the light collecting section 130. The light receiving section 140 may be a photodetector that generates an electrical signal on reception of light. The light receiving section 140 may be a photodetector formed by using a semiconductor material such as Ge, SiGe, SiC, Si, GaAs, AlGaAs, InP, InGaAs, or InGaAsP. The light receiving section 140 receives the light collected toward the center of the concentric circles of the metal pattern of the light collecting section 130, through the hole formed at the center of the concentric circles, on the side of the rear surface of the light collecting section 130. The light receiving section 140 directly receives the light components that have passed through the hole formed in the light collecting section 130, out of the light that has passed through the polarization dispersing section 120.

Figure 2:
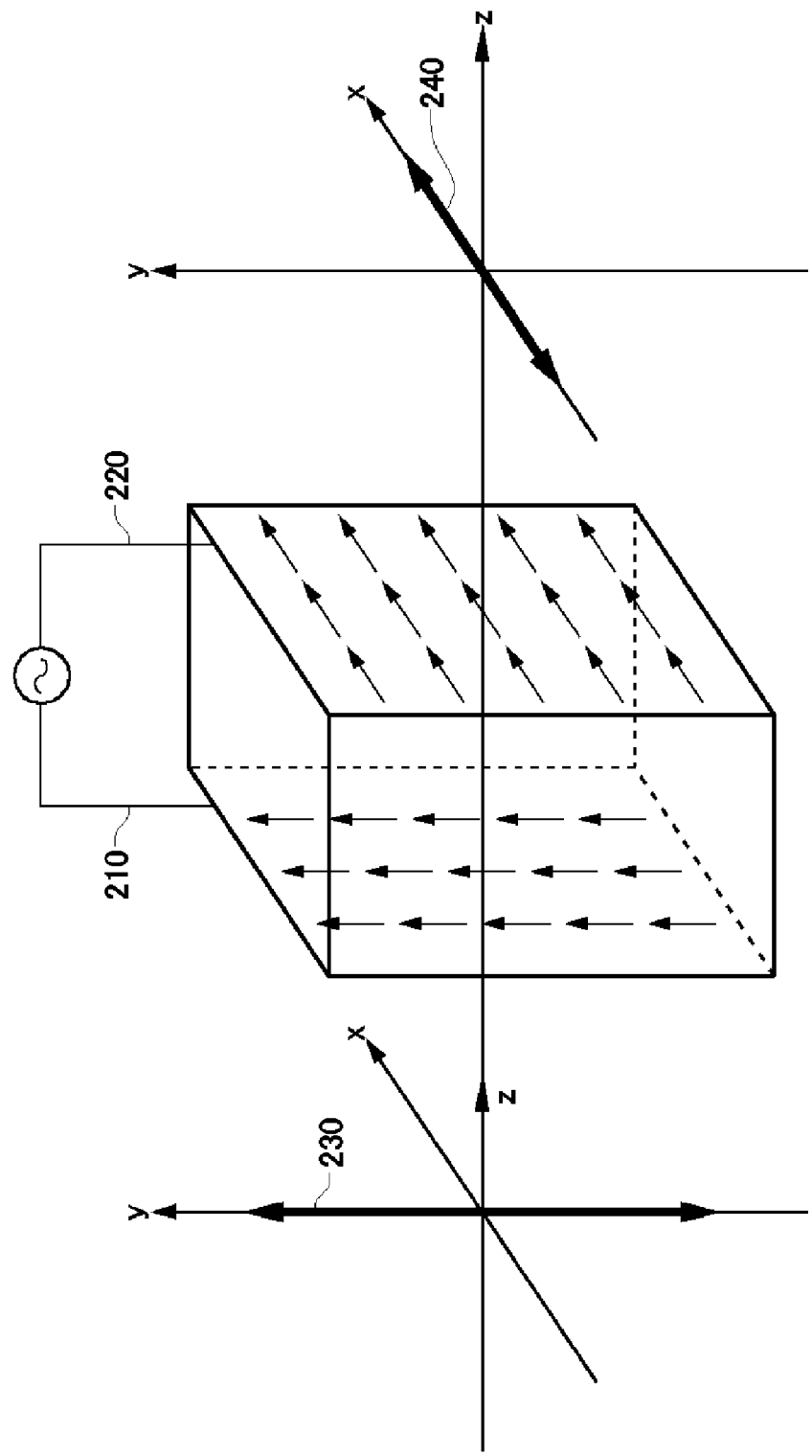
FIG. 2 illustrates an example of a polarization converting member 200.

FIG. 2 illustrates an example of a polarization converting member 200. The polarization converting member 200 voltage-controls whether to pass or block incoming light 230 and is used as pixels of liquid crystal panels. For example, the polarization converting member 200 converts the incoming light 230 that is polarized in a y-axis direction into outgoing light 240 that is polarized in an x-axis direction. The polarization converting member 200 may be a liquid crystal cell that is formed in such a manner that a liquid crystal material is enclosed between two light-transmissive substrates 210 and 220.

The substrate 210, which is positioned on the side of the incoming light 230, uniformly orients the liquid crystal molecules on the substrate 210 along the y-axis direction. The substrate 220, which is positioned on the side of the outgoing light 240, uniformly orients the liquid crystal molecules on the substrate 220 along the x-axis direction. The polarization converting member 200 may be subjected to such a liquid crystal molecule orientation treatment that, during the steady state, the orientations of the liquid crystal molecules between the two substrates 210 and 220 are successively rotated.

The polarization converting member 200 is known to be capable of optically rotating incoming light as determined by the orientations of the liquid crystal molecules when the incoming light has a wavelength within a range that is determined by the length of the optical path of the light passing through the polarization converting member 200, the concentration of the liquid crystal molecules, and the difference in refractive index between the right-circularly polarized light and the left-circularly polarized light passing through the liquid crystal molecules (Morgan's condition). Here, the polarization converting member 200 can control the orientations of the liquid crystal molecules enclosed between the substrates 210 and 220 by applying a predetermined voltage between the substrates 210 and 220. Thus, the polarization converting member 200 can control the polarization direction of the outgoing light 240.

For example, the polarization converting member 200 can extract the light components that have been successfully optically rotated to be oriented in the x-axis direction from the outgoing light 240 output from the substrate 220 and filter out the other light components, by controlling the outgoing light 240 to go through a polarizer whose polarization direction is oriented along the x-axis direction. Thus, the polarization converting member 200 outputs light during the steady state or while no voltage is applied (ON) and does not output light while a voltage is being applied due to the filtering-out function of the polarizer (OFF). In this manner, the polarization converting member 200 can turn on/off light output.

Figure 3:
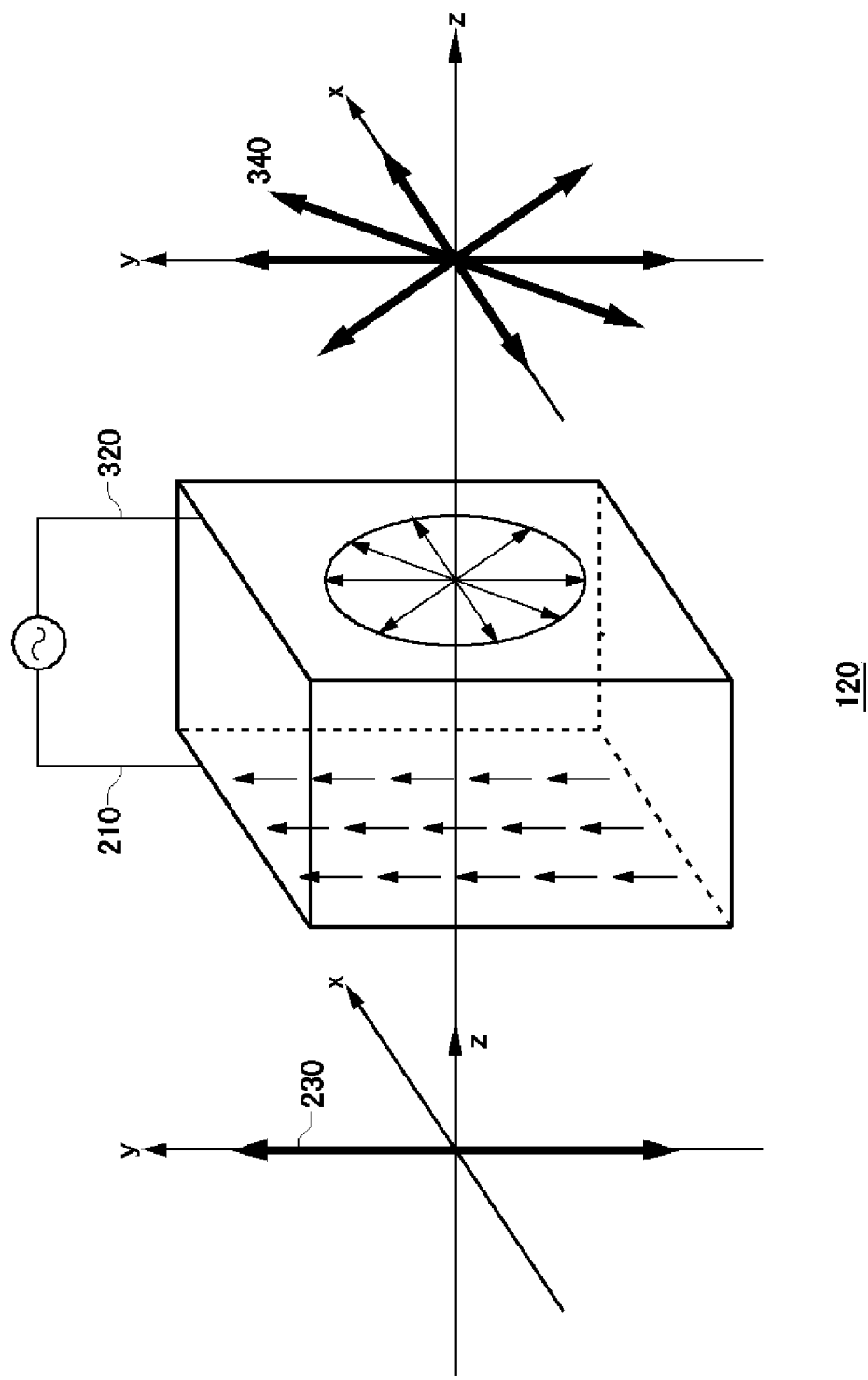
FIG. 3 illustrates an exemplary structure of a polarization dispersing section 120 relating to the embodiment of the present invention.

FIG. 3 illustrates an exemplary structure of the polarization dispersing section 120 relating to the embodiment of the present invention, which is based on the above-described liquid crystal technique. The polarization dispersing section 120 may disperse the polarization direction of the incoming linearly polarized light into a plurality of polarization directions that radiate from the hole formed in the light collecting section 130. For example, the polarization dispersing section 120 may convert incoming light 230 that is polarized in the y-axis direction into outgoing light 340 that is polarized in a plurality of directions that are radially dispersed. The polarization dispersing section 120 may be a liquid crystal cell that is formed in such a manner that a liquid crystal material is enclosed between two substrates 210 and 320.

The polarization dispersing section 120 may include a liquid crystal cell in which liquid crystal molecules are oriented in a single direction on a first surface and liquid crystal molecules are oriented in a radial or concentric manner on a second surface. For example, the substrate 210, which is positioned on the side of the incoming light 230, uniformly orients the liquid crystal molecules on the substrate 210 in the y-axis direction. The substrate 320, which is positioned on the side of the outgoing light 340, orient the liquid crystal molecules on the substrate 320 in a plurality of radiating directions. The polarization dispersing section 120 may be subjected to such a liquid crystal molecule orientation treatment that, during the steady state, the orientations of the liquid crystal molecules between the two substrates 210 and 320 are successively rotated.

With the above-described structure, the polarization dispersing section 120 can convert the incoming light 230 into the outgoing light 340 that are dispersed in a plurality of radiating polarization directions when the incoming light 230 has a wavelength within a range determined by the length of the optical path of the light, the concentration of the liquid crystal molecules, and the properties of the liquid crystal molecules. Here, the polarization dispersing section 120 can control the orientations of the liquid crystal molecules enclosed between the substrates 210 and 320 by applying a predetermined voltage between the substrates 210 and 320. Thus, the polarization dispersing section 120 can control the outgoing light 340 to be polarized in the same direction. In other words, the polarization dispersing section 120 can control the polarization direction of the outgoing light 340 through application of a voltage.

In the example shown in FIG. 3, the polarization dispersing section 120 disperses the incoming light 230 in a plurality of radiating polarization directions. Alternatively, the polarization dispersing section 120 may disperse the incoming light 230 in a plurality of concentric polarization directions. For example, the polarization dispersing section 120 may orient the liquid crystal molecules on the substrate 320 in a concentric manner, so as to produce the outgoing light 340 that is polarized in a plurality of concentric directions.

Alternatively, the polarization dispersing section 120 may apply a voltage to the substrate 210 in order to rotate the orientations of the liquid crystal molecules on the substrate 210 by 90 degrees and resultantly orient those liquid crystal molecules along the x-axis direction. In this case, the orientations of the liquid crystal molecules on the substrate 210 are different by 90 degrees than the polarization direction of the incoming light 230. Therefore, the plurality of radiating polarization directions of the outgoing light are respectively shifted by 90 degrees, so that the outgoing light is resultantly concentrically polarized. Accordingly, the polarization dispersing section 120 may switch the polarization directions of the outgoing light between the radiating directions and the concentric directions by controlling the voltage applied to the substrate 210.

Figure 4:
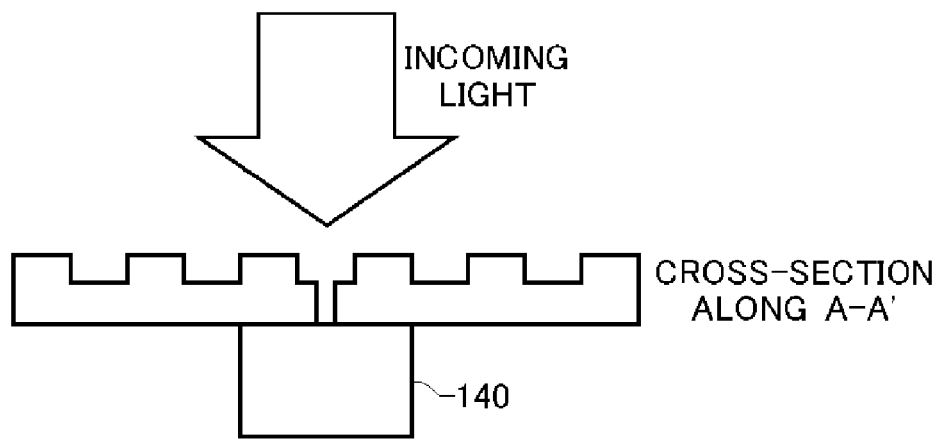
FIG. 4 illustrates an exemplary structure of a light collecting section 130 relating to the embodiment of the present invention.
Figure 4:
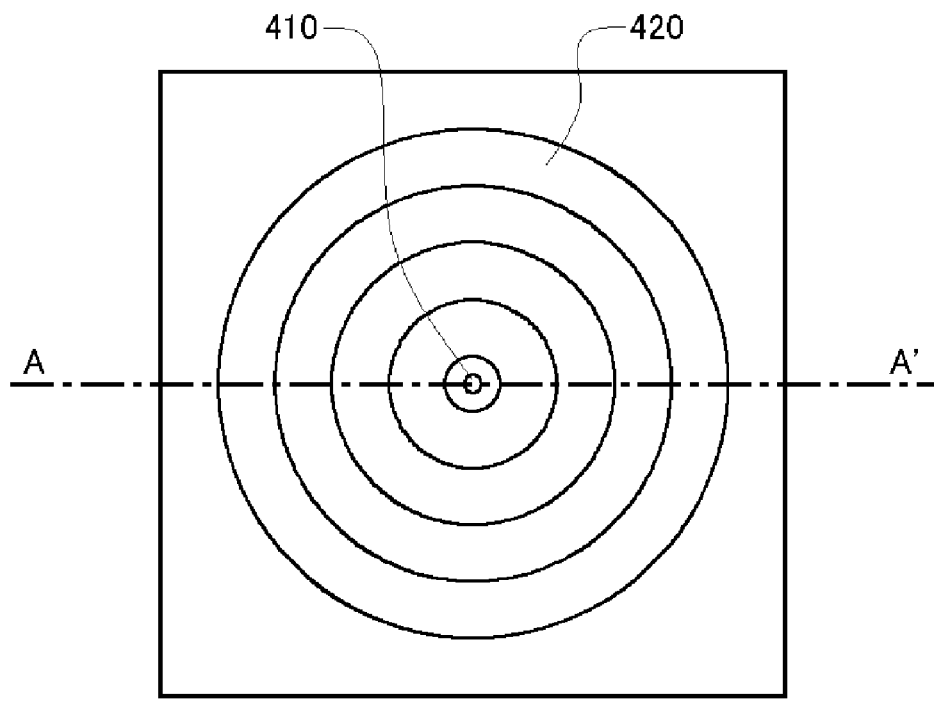

FIG. 4 illustrates an exemplary structure of the light collecting section 130 relating to the embodiment of the present invention. The cross-sectional view in FIG. 4 shows the light collecting section 130 along the line A-A', together with the light receiving section 140. The light collecting section 130 has a surface plasmon antenna having a metal pattern shaped like concentric circles on the surface thereof, and allows the collected light to propagate, through the hole at the center, to the light receiving section 140 that is positioned on the side of the rear surface of the light collecting section 130. The light collecting section 130 has a hole 410 and a concentric periodic structure 420.

The hole 410 is a minute opening and penetrates through the light collecting section 130. The hole 410 may be sized in area so as to be as large as or larger than the light reception area of the light receiving section 140. The hole 410 allows components of the incoming light that enter the hole 410 to pass through the light collecting section 130 and be directly received by the light receiving section 140.

The concentric periodic structure 420 may be fabricated by etching the surface of an electrically conductive thin film. The electrically conductive thin film may be formed by metal such as Ag, Au, Cu, Al, Ni, Pd, Pt, W, Ti, Cr, and/or Mo, or alloy.

The concentric periodic structure 420 may include a coupling periodic structure that couples, to the surface plasmons, light that enters the concentric periodic structure 420 substantially perpendicularly to the surface of the concentric periodic structure 420. Furthermore, the concentric periodic structure 420 may include a reflective periodic structure that Bragg-reflects some components of the surface plasmons coupled to the light by the coupling periodic structure that spread outward from the hole 410 at the center back toward the hole 410. The concentric periodic structure 420 may include an appropriate periodic structure determined by the wavelength of the incoming light.

Having the above-described structure, the light collecting section 130 enables the light receiving section 140 to receive even the components of the incoming light that are directed to the outside of the light reception area of the light receiving section 140. Thus, the light receiving section 140 can receive the incoming light with an excellent S/N ratio. Also, the light receiving section 140 can receive the light components that are distributed over an area larger than the light reception area, without the need of increasing the light reception area. Generally speaking, as the light reception area of the light receiving section 140 increases, the response speed of the light receiving section 140 decreases since the CR time constant resulting from the electrode structure of the light receiving section 140 increases. According to the light receiving device 100, however, the light collecting section 130 can increase the photosensitivity of the light receiving section 140 without sacrificing the response speed.

Figure 5:
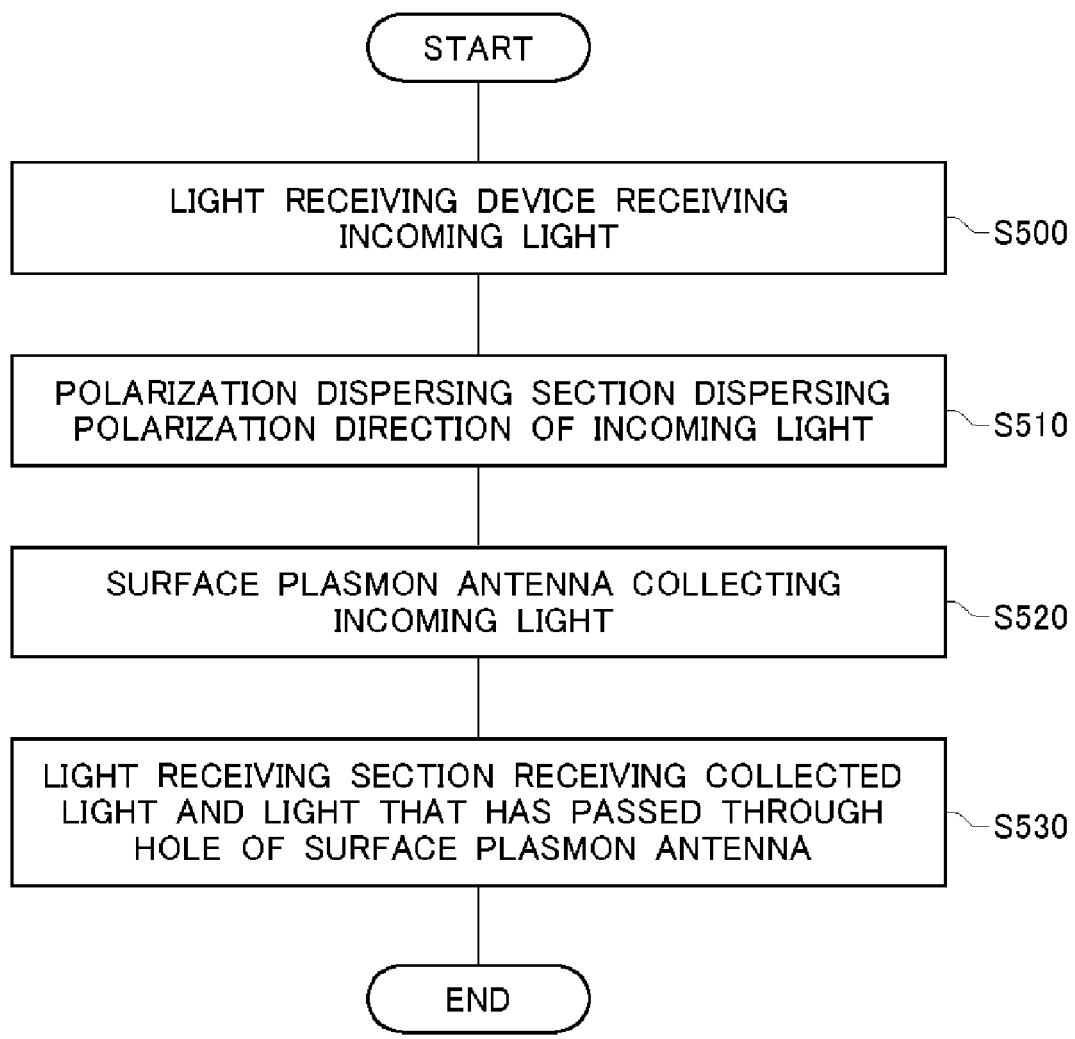
FIG. 5 illustrates a flow to operate the light receiving device 100 relating to the embodiment of the present invention.

FIG. 5 illustrates a flow to operate the light receiving device 100 relating to the embodiment of the present invention. The light receiving device 100 receives light under measurement from the light source 110 (S500). The light receiving device 100 may receive incoming light from the light source 110 through an optical system including optical guides such as lenses and/or optical fibers.

The polarization dispersing section 120 disperses the polarization direction of the incoming light into a plurality of radiating or concentric polarization directions (S510). The polarization dispersing section 120 allows the outgoing light with the dispersed polarization directions to propagate to the light receiving section 140. Here, the polarization dispersing section 120 may be positioned such that the center of the concentric or radiating polarization directions substantially coincides with the hole 410 at the center of the light collecting section 130.

The light collecting section 130 receives the outgoing light with the dispersed polarization directions and collects the light received by the region other than the hole 410 by means of the surface plasmon antenna (S520). Since the light received by the light collecting section 130 is polarized in a plurality of dispersed directions that radiate from the hole 410 or are concentrically centered around the hole 410, the surface plasmons can be generated to be widely distributed across the entire antenna of the light collecting section 130. Thus, the light collecting section 130 can achieve improved light collection efficiency.

The light receiving section 140 directly receives the light that passes through the hole 410, and also receives the light collected by the surface plasmon antenna through the same hole 410 (S530). In the above-described manner, the light receiving device 100 receives the incoming light emitted from the light source 110.

For example, the light source 110 may be a laser light source or the like and may output light that is polarized in a single direction. In this case, if the light collecting section 130 directly receives the light emitted by the light source 110, surface plasmons are generated in accordance with the polarization direction of the received light, in a tangent direction of the concentric circles of the surface plasmon antenna that is the same as the polarization direction. Thus, the surface plasmon antenna hardly generates surface plasmons in the direction perpendicular to the polarization direction of the light emitted from the light source 110. Accordingly, part of the antenna does not perform the light collecting function.

The present exemplary embodiment is made to address the above-described case where the incoming light is polarized in a single direction. Specifically speaking, the polarization dispersing section 120 radially or concentrically disperses the incoming light that is polarized in a single direction. In this way, the surface plasmon antenna can radially generate surface plasmons so that the entire antenna can collect light. Accordingly, the light collecting section 130 can efficiently collect the incoming light to the light receiving section 140.

To theoretically substantiate the above-described effects, an analysis was performed by using the Finite Differential Time Domain (FDTD) method. A surface plasmon antenna had a diameter of 6 mm and a substrate thickness of 40 μm and had a concentric periodic structure with a groove depth of 20 μm and a pitch of 300 μm.

First, a case was assumed where the surface plasmon antenna received incoming light that is polarized in a single direction and has a spot size of 3 mm. The total power PL was calculated which was excited on the surface of the surface plasmon antenna. Next, a case was assumed where the surface plasmon antenna received incoming light, which is produced by the polarization dispersing section 120, having the same intensity but being polarized in a plurality of radiating directions. Similarly, the total power PR was calculated which was excited on the surface of the surface plasmon antenna.

The results of the above-described calculations are used to determine PR/PL, which can implicitly estimate the improvement in the light reception efficiency achieved by the light receiving device 100. The present analysis calculated PR/PL as 18.95, which indicated that the light receiving device 100 relating to the present embodiment potentially achieves approximately 20-times higher light reception efficiency.

According to the above-described exemplary embodiment, the light receiving device 100 receives from the light source 110 incoming light that is polarized in a single direction. Alternatively, the light receiving device 100 may receive from the light source 110 incoming light that is already dispersed in a plurality of polarization directions. In this case, the light receiving device 100 may apply an appropriate voltage between the substrates 210 and 320 in order to prevent the outgoing light from being polarized in a single direction. The light receiving device 100 can provide appropriate light that is polarized in a plurality of dispersed directions with the light collecting section 130 by applying an appropriate voltage between the substrates 210 and 320, irrespective of the polarized state of the incoming light.

The light receiving device 100 may switch the polarization directions of the outgoing light from the polarization dispersing section 120 between the radial polarization directions and the concentric polarization directions, by applying a voltage to the substrate 210 at a particular timing. When the outgoing light from the polarization dispersing section 120 are polarized in a plurality of concentric directions, the surface plasmon antenna does not generate surface plasmons toward the hole 410, and the light receiving section 140 thus receives fewer light components. Consequently, the light receiving device 100 can control how much light the light receiving section 140 receives by applying a voltage to the substrate 210 at a particular timing.

Figure 6:
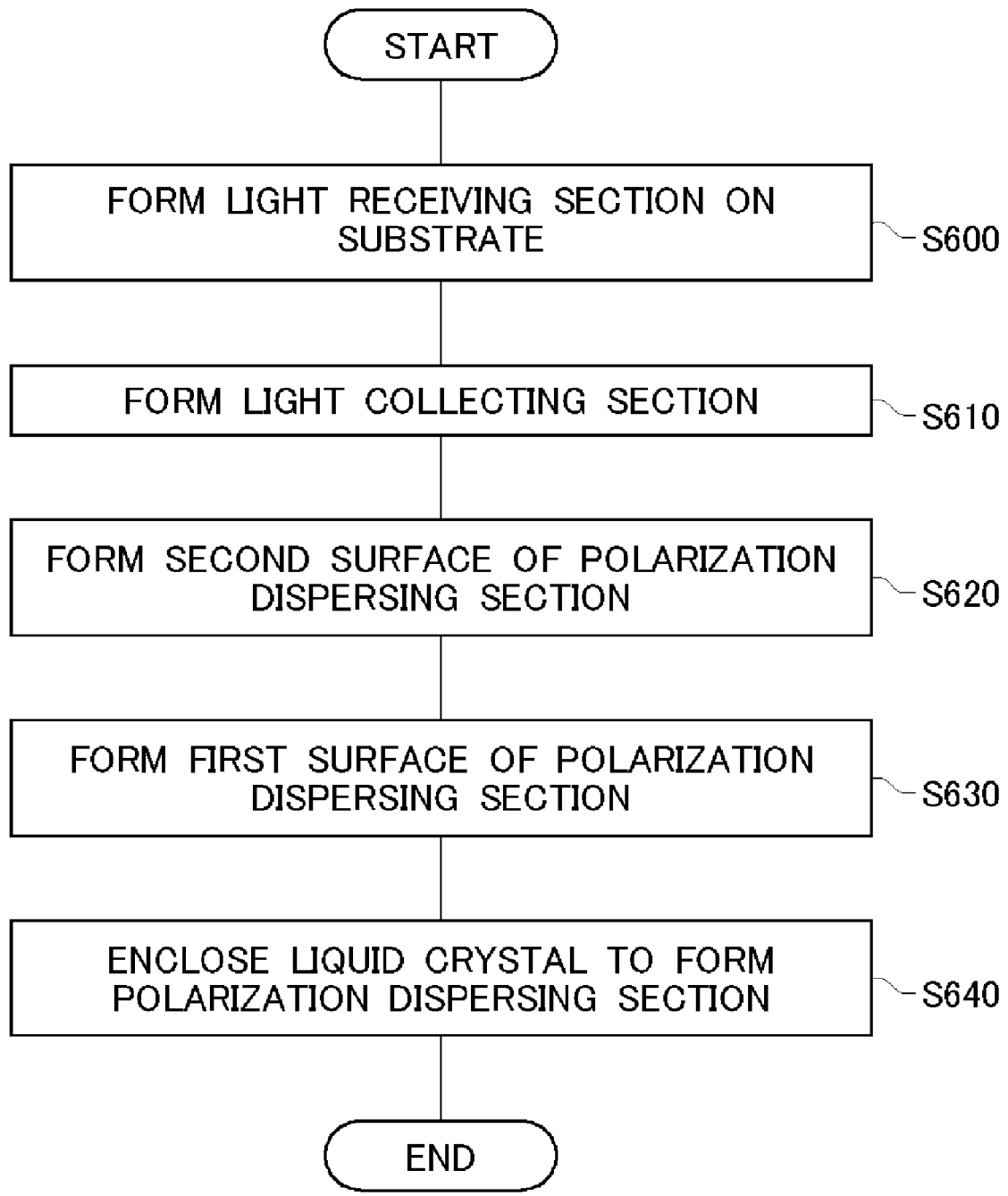
FIG. 6 illustrates a flow to manufacture the light receiving device 100 relating to the embodiment of the present invention.

FIG. 6 illustrates a flow to manufacture the light receiving device 100 relating to the embodiment of the present invention. A manufacturing method for the light receiving device 100 includes forming a polarization dispersing section that disperses a polarization direction of the incoming light into a plurality of polarization directions, forming a light collecting section that has a metal pattern shaped like concentric circles on a surface thereof, where the light collecting section collects light that has passed through the polarization dispersing section, and forming a light receiving section that receives the light collected by the light collecting section.

To begin with, the light receiving section 140 is formed on a substrate (S600). Here, the substrate may be formed by a material appropriately selected depending on the material of the light receiving section 140, from materials such as Si, GaAs, or InP. The light receiving section 140 may have a light reception area that is sized so as to be capable of sufficiently responding to the modulation frequency of the light to be detected. When the light receiving section 140 is formed, the light receiving section 140 may be positioned, on the rear side of the light collecting section 130, so as to be capable of receiving the light collected toward the center of the concentric circles of the metal pattern of the light collecting section 130 through the hole 410 at the center of the concentric circles.

On the light receiving section 140, the light collecting section 130 is formed (S610). In this step, a surface plasmon antenna may be formed which has a metal pattern shaped like concentric circles on the surface thereof, so as to constitute at least part of the light collecting section 130. The light collecting section 130 may be positioned such that the center of the hole 410 at the center of the concentric circles is on the same axis as the center of the light receiving section 140.

Subsequently, the polarization dispersing section 120 is formed. In this step, the polarization dispersing section 120 is formed which has a liquid crystal cell in which liquid crystal molecules are oriented in a single direction on a first surface and liquid crystal molecules are oriented in a radial or concentric manner on a second surface. Specifically speaking, steps S620 to S640 treat the liquid-crystal-side surface of the liquid crystal alignment film formed on the first surface so as to align the liquid crystal molecules in a single direction, treats the liquid-crystal-side surface of the liquid crystal alignment film on the second surface so as to align the liquid crystal molecules in a radial or concentric manner, and enclose liquid crystal between the liquid crystal alignment film on the first surface and the liquid crystal alignment film on the second surface, thereby forming the polarization dispersing section 120.

More specifically, a liquid crystal alignment film is applied onto the surface of the light collecting section 130 on which the metal pattern is concentrically formed, to form the second surface of the polarization dispersing section 120 (S620). Here, the second surface of the polarization dispersing section 120 may be formed by applying a liquid crystal alignment film onto a transparent circular pattern electrode. After this, the first surface of the polarization dispersing section 120 may be formed by applying a liquid crystal alignment film onto a transparent flat electrode and treating the liquid crystal alignment film so as to align the liquid crystal molecules in a single direction (S630).

Following this, liquid crystal is enclosed between the first surface and the second surface and the temperature of the liquid crystal is raised to reach the phase transition temperature or higher. The temperature of the liquid crystal is then lowered to reach a temperature lower than the phase transition temperature while radial electric fields are kept applied by the flat and circular pattern electrodes. In this way, the liquid crystal cell may be formed in which the liquid crystal molecules are oriented in a single direction on the first surface and the liquid crystal molecules are oriented in a radial or concentric manner on the second surface (S640). According to the above-described manufacturing method, the light receiving device 100 can be formed on a semiconductor substrate as a single device.

Alternatively, the light receiving device 100 may be manufactured by assembling the light collecting section 130 and the light receiving section 140, which are manufactured by a semiconductor manufacturing apparatus, and the polarization dispersing section 120, which is manufactured by a liquid crystal manufacturing apparatus. It may be sometimes difficult to form the polarization dispersing section 120 directly on the light collecting section 130 depending on the periodic structure of the light collecting section 130 and/or the material of the light collecting section 130. Taking such factors into consideration, the method to manufacture the polarization dispersing section 120 of the light receiving device 100 may be appropriately selected.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A light receiving device comprising:
a polarization dispersing section that disperses a polarization direction of incoming light into a plurality of polarization directions;
a light collecting section that has a metal pattern shaped like concentric circles on a surface thereof, the light collecting section collecting light that has passed through the polarization dispersing section; and
a light receiving section that receives the light collected by the light collecting section.

2. The light receiving device as set forth in claim 1, wherein
the light collecting section has a surface plasmon antenna that has the metal pattern shaped like the concentric circles on a surface thereof, and
the light receiving section receives the light collected toward a center of the concentric circles of the metal pattern of the light collecting section, through a hole at the center of the concentric circles, on a rear side of the light collecting section.

3. The light receiving device as set forth in claim 2, wherein
the polarization dispersing section disperses a polarization direction of incoming linearly polarized light into a plurality of polarization directions that radiate from the hole formed in the light collecting section.

4. The light receiving device as set forth in claim 1, wherein
the polarization dispersing section has a liquid crystal cell in which liquid crystal molecules are oriented in a single direction on a first surface and liquid crystal molecules are oriented in a radial or concentric manner on a second surface.

5. A manufacturing method for a light receiving device that receives incoming light, comprising:
forming a polarization dispersing section that disperses a polarization direction of the incoming light into a plurality of polarization directions;
forming a light collecting section that has a metal pattern shaped like concentric circles on a surface thereof, the light collecting section collecting light that has passed through the polarization dispersing section; and
forming a light receiving section that receives the light collected by the light collecting section.

6. The manufacturing method as set forth in claim 5, wherein
forming the light collecting section includes forming the light collecting section having a surface plasmon antenna that has the metal pattern shaped like the concentric circles on a surface thereof, and
forming the light receiving section includes forming the light receiving section that receives the light collected toward a center of the concentric circles of the metal pattern of the light collecting section, through a hole at the center of the concentric circles, on a rear side of the light collecting section.

7. The manufacturing method as set forth in claim 5, wherein
forming the polarization dispersing section includes forming the polarization dispersing section having a liquid crystal cell in which liquid crystal molecules are oriented in a single direction on a first surface and liquid crystal molecules are oriented in a radial or concentric manner on a second surface.

8. The manufacturing method as set forth in claim 7, wherein
forming the polarization dispersing section includes:
treating a liquid-crystal-side surface of a liquid crystal orientation film at the first surface so as to orient the liquid crystal molecules in the single direction;
treating a liquid-crystal-side surface of a liquid crystal orientation film at the second surface so as to orient the liquid crystal molecules in the radial or concentric manner; and
enclosing liquid crystal between the liquid crystal orientation film at the first surface and the liquid crystal orientation film at the second surface.

9. The manufacturing method as set forth in claim 8, wherein
forming the polarization dispersing section includes:
forming the second surface of the polarization dispersing section by applying the liquid crystal orientation film onto a surface of the light collecting section on which the metal pattern is formed as the concentric circles;
forming the liquid crystal orientation film of the first surface; and
enclosing the liquid crystal between the liquid crystal orientation film of the first surface and the liquid crystal orientation film of the second surface.

10. The manufacturing method as set forth in claim 7, wherein
forming the polarization dispersing section includes:
applying a liquid crystal orientation film onto a transparent flat electrode and treating the liquid crystal orientation film so as to orient liquid crystal molecules in a single direction, to form the first surface of the polarization dispersing section;
applying a liquid crystal orientation film onto a transparent circular pattern electrode, to form the second surface of the polarization dispersing section;
enclosing liquid crystal between the first surface and the second surface;
raising a temperature of the liquid crystal to a phase transition temperature or higher;
lowering the temperature of the liquid crystal to reach a temperature lower than the phase transition temperature while radial electric fields are kept applied by the flat electrode and the circular pattern electrode.

11. A light receiving method comprising:
dispersing a polarization direction of incoming light into a plurality of polarization directions;
collecting the dispersed incoming light by using a light collecting section that has a metal pattern shaped like concentric circles on a surface thereof; and
receiving the collected light.

* * * * *